United States Patent [19]

Coroncos

[11] 4,294,865
[45] Oct. 13, 1981

[54] PROCESS FOR PREPARING BEEF FOR USE ON A VERTICAL ROTISSERIE

[76] Inventor: James H. Coroncos, 11335 Frederick Rd., West Friendship, Md. 21794

[21] Appl. No.: 203,576

[22] Filed: Oct. 29, 1980

Related U.S. Application Data

[60] Continuation of Ser. No. 53,580, Jun. 28, 1979, abandoned, which is a division of Ser. No. 917,077, Jun. 19, 1978, Pat. No. 4,245,373.

[51] Int. Cl.³ .............................................. A23L 1/31
[52] U.S. Cl. .................................. 426/646; 426/513; 426/514
[58] Field of Search ............... 426/134, 646, 513, 609, 426/514, 652, 295; 17/32

[56] References Cited

U.S. PATENT DOCUMENTS

| | | | |
|---|---|---|---|
| 1,808,993 | 6/1931 | Murray | 17/32 |
| 2,373,781 | 8/1945 | Richardson | 17/32 |
| 2,670,296 | 2/1954 | Transley | 426/513 |
| 3,083,108 | 3/1963 | Kline et al. | 426/646 |
| 3,482,998 | 12/1969 | Carroll et al. | 426/646 |
| 3,604,341 | 9/1971 | Coroneos | 99/421 V |
| 3,863,020 | 1/1975 | Robinson | 426/646 |
| 3,934,308 | 1/1976 | Neri | 17/32 |
| 4,023,912 | 5/1977 | Mahler et al. | 426/609 |
| 4,106,162 | 8/1978 | Fournier | 17/32 |

*Primary Examiner*—Joseph M. Golian
*Assistant Examiner*—George C. Yeung
*Attorney, Agent, or Firm*—Walter G. Finch

[57] ABSTRACT

The invention is an improved process and process equipment for preparing beef for cooking, particularly for cooking on a vertical rotisserie. The process is a step-by-step procedure for preparation of the beef. The process uses special process equipment of this invention that molds and compresses the beef preparation in a specific way to accomplish the end result that overcomes problems of the prior art in preparing beef for cooking on a vertical rotisserie.

10 Claims, 7 Drawing Figures

PROCESS FOR PREPARING BEEF FOR USE ON A VERTICAL ROTISSERIE

This is a continuation of U.S. application Ser. No. 53,580, filed June 28, 1979, now abandoned, which is a divisional of U.S. application Ser. No. 917,077, filed June 19, 1978, now U.S. Pat. No. 4,245,373.

BACKGROUND AND SUMMARY OF THE INVENTION

The invention relates to processes for preparing beef for cooking and in particular for cooking on a vertical rotisserie. The invention also relates to the process equipment used for preparing the aforementioned beef, and in particular to the novel and unique key process equipment used in this novel and unique process.

The inventor is also the inventor of the vertical rotisserie of U.S. Pat. No. 3,604,341 issued Sept. 14, 1971, for which this process for preparing beef has been successfully developed, along with the special key process equipment needed to process the beef in accordance with the process procedure.

This process concerns the use of beef only, and should not be confused with various processes which use lamb or other meats. No one in the past has been able to process beef in a manner that could be successfully cooked on a vertical rotisserie, because beef has been found to be difficult to prepare. This process has been developed after long experimental trials to arrive finally at the present process which works and which does not crack and break up during cooking.

In the prior art the meat (beef) cracked at the base and fell apart as other balls of meat were placed on the skewer of the vertical rotisserie and then cooked. When lamb is used it has a sticky consistency and sticks together, but beef does not. In the prior art, the use of lamb and other meats provided characteristics that aided in the preparation and the cooking, however, the taste of lamb was not desirable in a beef product; more people, however, like beef.

In the prior art for preparing beef, the meat to be used was selected, the beef was ground, flavoring ingredients added and mixed into the ground meat, then the mixture was formed into a ball-shaped lump by hand and put on the skewer of the vertical rotisserie and pushed down to a metal bottom plate. Then another ball was formed and placed on the skewer and pushed down to the top of the second ball.

This process above continued until four or five balls of meat were on the skewer. Each ball of meat was mashed down to interface with the ball of meat below. Some meat of each ball squeezed out all around, and the bottom ball of meat was cracked and squeezed down thinner than the others. Each successive layer was thinner than the layer above. Some of the bottom ball of meat would hang down over the metal plate at the bottom of the skewer.

Next, in the above process, the meat outside the bottom metal plate was trimmed off. The trimming of the meat above the plate sloped outwardly from the metal plate to the top ball of meat (which by now was somewhat flattened), until the diameter of the meat at the top was larger than the metal plate at the bottom.

The meat was then cooked on the rotisserie, but as aforementioned, the meat would crack and break up.

In the new process, a special process of selecting beef is followed, trimming and combining of the various meat selection follows. The meat is then cut into chunks for grinding in a mechanical grinder. The beef is then ground twice.

Separately, a mixture of additive ingredients is prepared for binding and flavoring.

The ground beef is spread out on a wide surface, the additive ingredients spread over the ground beef and thoroughly kneaded into the ground beef.

The beef mixture is then molded and compressed into a cylindrical shape by the special processing equipment invented for this process, precautions being taken so that the molded meat can be lifted when the mold is removed; during the compressing an insert is placed in the center to provide a hole for the skewer. The equipment invented for this process includes the features for placing the insert into the meat.

After molding and compressing, the meat is wrapped and frozen. When it is used the molded units are placed on the skewer by inserting the skewer through the molded hole. A plastics disc, designed for this invention, is placed over the aforementioned metal plate at the bottom of the skewer. The plastics disc permits a layer unit of beef to be used and also protects the cutting edge of the carving knives.

The new process and the equipment invented for the process, have made it possible to now use beef on a vertical rotisserie without adding lamb or other meats to the beef; the beef does not crack or break up during cooking.

It is, therefore, an object of the invention to provide a process for preparing beef for cooking on a vertical rotisserie.

It is a further object of the invention to provide processing equipment for preparing beef for cooking on a vertical rotisserie.

Another object of the invention is to provide a process for returning ground beef to a more or less solid form that eliminates the need for lamb or other meats for preparing beef for cooking on a vertical rotisserie.

It is another object of the invention to provide a process and process equipment for preparing beef in symmetrical sizes for cooking on a vertical rotisserie that will permit cooking without cracks developing in the meat or without the meat breaking up during cooking.

Further objects and advantages of the invention will become more apparent in light of the following description of the preferred embodiments.

DESCRIPTION OF THE PREFERRED EMBODIMENTS

Figure 1:
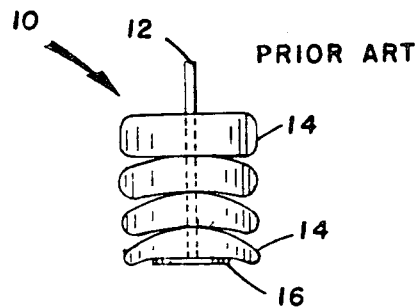
FIG. 1 is a side view of the prior art of layers of prepared meat on a rotisserie skewer, prior to trimming.
Figure 2:
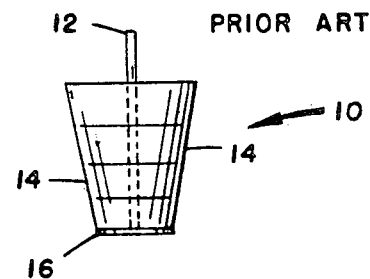
FIG. 2 is a side view of the prior art of layers of prepared meat on a rotisserie skewer, after trimming.
Figure 3:
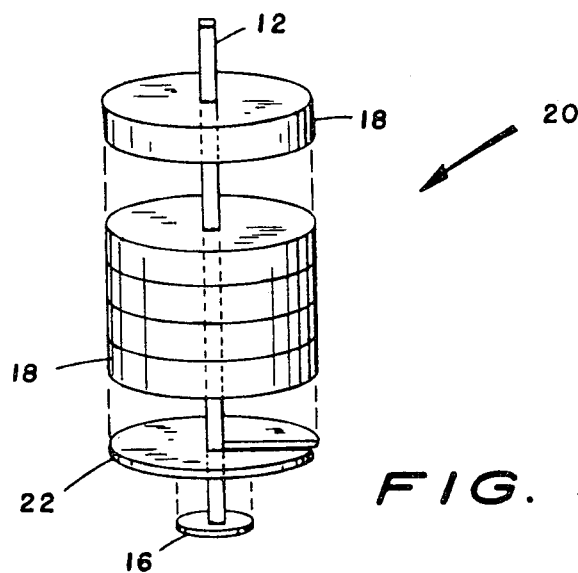
FIG. 3 is an exploded pictorial view of the improved art of layers of meat on a rotisserie skewer.
Figure 4:
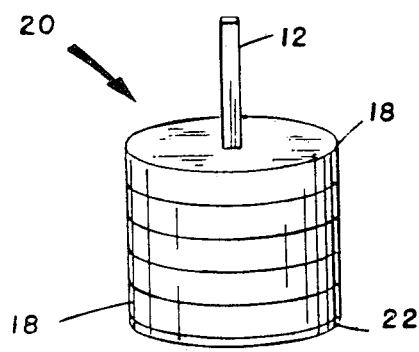
FIG. 4 is a pictorial view of the improved art of layers of meat on a rotisserie skewer.

Referring now to the drawings and particularly to FIGS. 1, 2, 3, 4, and 6, the prior art can be seen at 10 in FIGS. 1 and 2, and the improved art of this invention can be seen at 20 in FIGS. 3 and 4. The beef compressing device 28 used in the process of this invention can be seen in FIG. 6.

In the prior art seen in FIG. 1, balls of meat 14 were placed on the skewer 12 and partially flattened. As each succeeding ball of meat 14 was placed on the skewer 12 it compressed the ball of meat 14 below it and, in due time, the edges of the meat 14 began to sag over the metal plate 16 at the bottom of the skewer 12, as can be seen in FIG. 1. Thus, the thickness of each layer (each flattened ball of meat 14) was thinner than the layer above it, each ball of meat 14 becoming a flattened layer of meat 14.

When the skewer 12 was loaded, the sides of the layers of meat 14 were trimmed as shown in FIG. 2, sloping outwardly from the metal plate 16 at the bottom of skewer 12 upwardly to the top layer of meat 14.

The use of the improved processed meat layers or meat units 18 shown in FIGS. 3 and 4 is described hereinafter following the description of the process of this invention to form the meat units 18.

Figure 5:
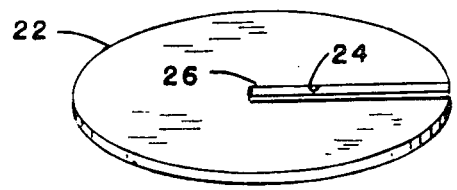
FIG. 5 is a pictorial view of an enlarged supporting disc for meat units.
Figure 6:
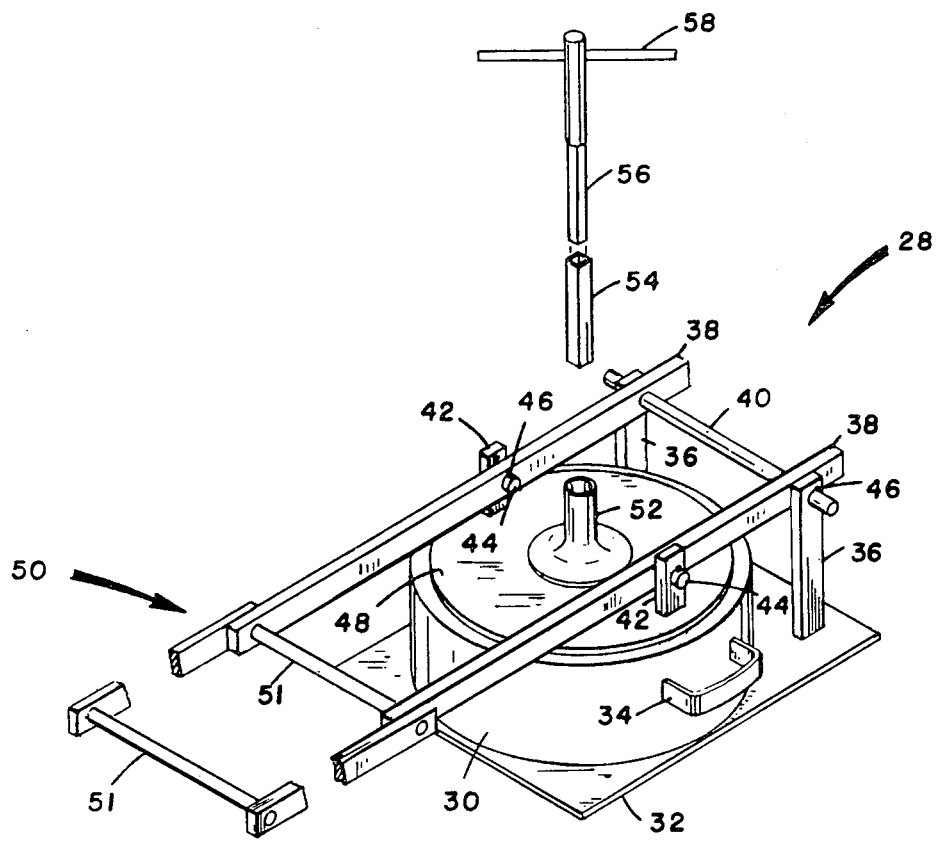
FIG. 6 is a pictorial view beef compressing device.
Figure 7:
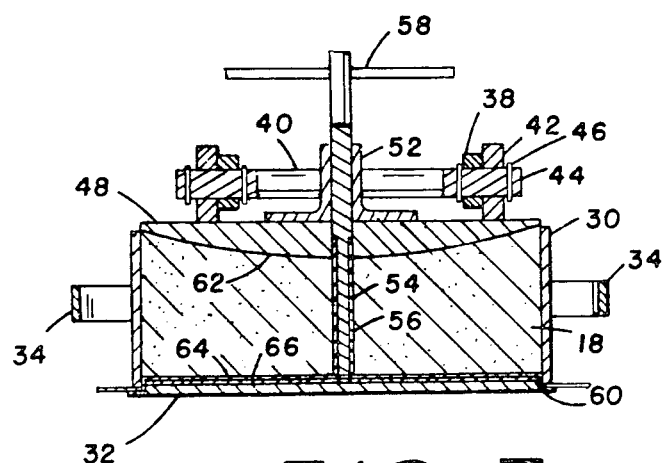
FIG. 7 is a cross section beef compressing device.

The process equipment shown in FIGS. 5, 6, and 7 is described hereinafter in conjunction with the invented process for preparing beef for cooking on a vertical rotisserie. The process equipment is introduced, described, and defined at those steps in the invented process where it is used to accomplish a specific result.

Describing now the invented process for preparing beef for cooking on a vertical rotisserie, the process is described and defined in the following steps.

Step 1: Select quantity of beef to be processed from various parts of a beef carcass to obtain a blend between very lean beef and partially fat beef. Note: The combination of the various parts as to location on the carcass and the amounts of each is determined by trial experimentation to obtain the desired end result.

Step 2: Remove a portion of the fat from those partially fat parts of the selected beef. Note: The remaining fat (amount determined by trial experimentation to obtain the desired end result) is important in later processing as a requirement to hold processed beef together as later defined.

Step 3: Cut beef parts into small pieces for grinding in a mechanical grinder. Note: The size of pieces must be such that the mechanical grinder will take them.

Step 4: Grind the pieces of beef in the mechanical grinder and then regrind the ground meat a second time in the mechanical grinder.

Step 5: Prepare a mixture of additive ingredients consisting of water, onions, textured soya flours, ground rice, soya and barley flours, honey powder (cane sugar and honey), salt, monosodium glutamate, paprika, and spices. Note: These additive ingredients provide flavoring for taste (arrived at by trial experimentation) and part of the ingredients serve as a helping binder when mixed with the previously specified beef in a later step.

Step 6: Spread out the ground beef (from Step 4) on a wide working surface, and then spread the additive ingredients (from Step 5) evenly over the spread out beef.

Step 7: Knead the combination of ground beef and the additive ingredients until the additive ingredients are thoroughly and evenly mixed throughout the ground beef.

Step 8: Place a round cardboard lifting disc 66 on the section of the base 32 of the beef compressing device 28 and within the mold centering section 60 on said base 32 of the beef compressing device 28. Place a sheet of plastics or wax paper wrapping material 64 over said round cardboard lifting disc 66 and centered thereon. Said sheet of plastics or wax paper wrapping material 64 sized to wrap the prepared beef unit 18 in a later step. Place the cylindrical open-ended mold 30 on said sheet of wrapping material 64 so that said mold 30 fits over the mold centering section 60 on base 32 of beef compressing device 28. Spray edible oil on the inside surface of said mold 30 for lubrication. Place a measured portion of the beef mixture (from Step 7) into said mold 30. Note: The round cardboard lifting disc 66 is to support the beef unit 18 when lifted in a later step. It is to be understood that a shape of the cardboard other than round or any material other than cardboard is within the scope and intent of this invention. Also, it is to be understood that the use of other wrapping material instead of said plastics or wax paper wrapping material is within the scope and intent of this invention. Further, the use of any type of lubricant other than an edible oil for the inside of said mold and the application of said lubricant by any means other than by spraying (such as brushing), are within the scope and intent of this invention. Said mold 30 may be tapered to provide draft to facilitate later removal of meat unit from mold 30. An alternative to the mold centering section 60 (not shown) may be a plurality of pins in the base 12 against which the mold 30 is placed.

Step 9: Compress the beef in said mold 30 by manually operating the hand lever 50 by hand grip 51 on arms 38 of said compressing device 28 so that the compressing plate 48 of said compressing device 28 moves downward and into top side of said cylindrical open-ended mold 30. Continue to operate said hand lever 50 in a downward direction so that and until essentially all entrapped air within said beef 18 in said mold 30 is squeezed out of said beef 18 and said beef 18 is essentially a solidly compressed and compacted unit simulating an equivalent piece of the original beef carcass. The compressing action also serves to bind the meat mixture together. This prevents the aforementioned breaking and cracking. Note: The face 62 of said compressing plate 48 is convex, spherically arcurate shaped in all directions in cross section as seen in FIG. 7. The convex face 62 of said compressing plate 48 leaves the compressed beef in said mold 30 concave on the top surface where said beef interfaces with said convex face 62. It is to be understood that a powered operation of said hand lever 50 instead of a manual operation is within the scope and intent of this invention. The concave surface will gradually rise as the over-pressed meat mixture springs or expands slightly when the compressing plate 48 is lifted and removed from the meat in a later step in the process. The expansion will bring the concave surface to an essentially level configuration. The amount of curvature of said face 62 of said compression plate 48 having been ascertained by trial experimentation to determine the amount of such curvature that would subsequently result in said level configuration of said meat when the compressor plate 48 is lifted and removed.

Step 10: While said compressor plate 48 is still in contact with said beef 18 in said mold 30 in the compressed state, place a hollow plastics skewer sleeve 54 on solid mandrel 56 and insert the combination through guide collar 52 affixed on the compressor plate 48 and through aperture in compressor plate 48 and force the combination sleeve 54 and solid mandrel 56 downward through said guide collar 52 and compressor plate 48 and into and through the meat unit 18 in said mold 30 until sleeve 54 and mandrel 56 bottom on the support below said mold 30. Said guide collar 52 and hole in compressor plate 48 maintain mandrel 56 and sleeve 54 in vertical alignment through center of meat unit 18. Note: The sleeves 54 and mandrel 56 will force the meat to one side or the other as the sleeve 54 and mandrel 56 pass through the meat. Blows from a mallet may be used to force the sleeve 54 and mandrel 56 through the meat if manual pressure on handle 58 is insufficient. It should be understood that the use of a material other than plastics for the sleeve or the use of a conformation other than a solid mandrel, are within the scope and intent of this invention.

Step 11: Remove said mandrel 56 from said sleeve 54 leaving said sleeve 54 within the compressed meat 18 in said mold 30. Note: Said sleeve 54 fits on square end of mandrel 56 so that diagonal outside dimension of sleeve 54 is the same as the outside diameter of the upper part of mandrel 56. Said sleeve 54 is of a height equal to final height of compressed meat unit 18.

Step 12: Lift compressor plate 48 by operating; hand lever 50 in an upward direction.

Step 13: Remove mold 30 from compressed meat 18 by lifting mold 30 upward by manually lifting upward on two handles 34 on said mold 30. Note: The square sleeve 54 in the center of the compressed meat is of a size to receive the skewer 12 when the meat unit 18 is later placed on skewer 12 for cooking.

Step 14: Raise said wrapping material on all sides of meat unit 18 and wrap the meat unit 18 carefully with said wrapping material 64.

Step 15: Lift said meat unit 18, wrapped in said wrapping material 64 on said cardboard disc 66 and place in a freezer.

The above completes the process of preparing beef for cooking on a vertical rotisserie.

The operating handle 50 of the beef compressing device 28 is provided with a permanently affixed extension of arms 38 and an extra hand grip 51 for extra leverage to assure a high compression of the meat unit 18 to squeeze out all entrapped air and to obtain a good binding of the ingredients. It is to be understood that the extension of arms 38 may be made as one-piece arms 38 instead of as an added extension.

The arms 38 are pivotally connected to the compressor plate 48 by shafts 46 extending through said arms 38 and through lugs 42 on the top of said compressor plate 48. Pins 46 retain the shafts 46 in place.

An alternative (not shown) is to attach said arms 38 to said compressor plate 48 by a plurality of connections greater than two for even distribution of pressure. Side lugs (not shown) on arms 38 to serve as "hold-down" projections for mold during pressure stage may also be added. An alternative is to provide hold-down lugs attached to the base 32.

Fulcrum supports 36 are permanently attached to base 32 and extend upwardly. At the top of said fulcrum supports 36, the arms of operating handle 50 are pivotally connected to said fulcrum supports 36 by a shaft 40 extending through said fulcrum supports 36 and said arms 38 and held in place by pins 46 at the outside ends of said shaft 40.

It is to be understood that methods other than pins for attaching shafts to moveable parts are within the scope and intent of this invention.

When the beef is to be cooked, the frozen meat units 18 are removed from the freezer and unwrapped and placed on skewer 12, by passing the skewer 12 through the plastics sleeve 54 in the center of each meat unit 18. Usually four or five meat units 18 are placed on the skewer 12, but it is to be understood that more or less than four or five may be placed on the skewer 12 in accordance with the need.

In order to accept the larger diameter meat unit 18 on the skewer 12, and to protect the cutting edge of knives when carving the cooked meat, plastics disc 22 is placed on the metal bottom plate 16 and around the skewer 12. The slot 24 in said plastics disc 22 permits sliding said plastics disc 22 on to said skewer 12 up to the end 26 without passing it over the top end of the skewer 12. The slot 24 in plastics disc 22 also permits removing it by sliding it outwardly when the diameter of the meat unit 18 is very small so that the meat unit 18 can be moved closer to the heat unit of the verticle rotisserie. The meat is sliced from top to bottom and thus the cutting knife approaches the supporting plastics disc 22. The use of the plastics disc 22 permits using a larger diameter meat unit 18 and thus puts up more meat for cooking and requiring fewer changes.

It is to be understood that certain steps in the process hereinbefore established may be combined (such as steps 6 and 7) and may be mixed mechanically. Such variations are within the scope and intent of the invention.

It is to be noted that in the prior art the hand processing did not exclude very much of the entrapped air in the ground beef. In the present invention, pressing the beef and sequeezing out the air provides a method by which the beef unit 18 becomes a more or less solid mass that prevents it from cracking and breaking as occurred in the prior art.

In the present invention, the ability to have vertical sides, instead of the tapered sides as in the prior art, permits the stacked beef units 18 to be cooked vertically without the need for tilting the skewer so that the full side of the tapered meat was equidistant from the heating element. Also, the use of the plastics disc 22 and the elimination of the tapered sides permits a greater quantity of meat to be prepared and placed on the rotisserie.

The use of the sleeve 54 permits the preparation of the meat units 18 and freezing them without using a skewer to mold the hold through the unit (until frozen) as was done in the prior art.

As can be readily understood from the foregoing description of the invention, the present structure of equipment and the process procedure can be configured in different modes and rearranged steps, respectively, to provide the ability to process beef for cooking on a vertical rotisserie.

Accordingly, modifications and variations to which the invention is susceptible may be practiced without departing from the scope and intent of the appended claims.

What is claimed is:

1. A process for preparing beef for use on a vertical rotisserie, comprising:

selecting a quantity of beef to be processed from a beef carcass in a blend between very lean beef and partially fat beef;

removing a portion of the fat from those partially fat parts of selected beef;

cutting said beef into small pieces for grinding in a mechanical grinder;

grinding said small pieces of beef in said mechanical grinder and then regrind the ground meat a second time in said mechanical grinder;

preparing a mixture of additive ingredients;

spreading out the ground beef on a wide working surface, and then spreading said additive ingredients evenly over the spread out beef;

kneading the combination of ground beef and additive ingredients until said additive ingredients are thoroughly and evenly mixed throughout the ground beef;

lubricating interior surfaces of beef unit mold and thereafter successively place lifting disc, sheet of beef unit wrapping material, and beef unit mold on base of beef compressing device centered on mold centering section of beef compressing device, said mold interfacing in locating groove in base of beef compressing device, place measured portion of said combination of ground beef and additive ingredients into said mold;

operating beef compressing device to move compressor plate of beef compressing device into said beef unit mold to compress said combination of ground beef and additive ingredients mass into said mold and to compress until substantially all entrapped air is squeezed out of said combination of ground beef and additive ingredients, said compressor plate forming a concave spherically arcurate depression across the uppermost surface of the compressed mass;

placing skewer sleeve on mandrel and insert skewer sleeve and mandrel through guide collar and compressor plate aperture and force combined skewer sleeve and mandrel into compressed meat unit;

removing said mandrel, thereby leaving said skewer sleeve embedded within said compressed meat unit;

operating said compressing device to remove said compressor plate of said compressing device from said mold, thereby permitting said concave spherically arcurate depression across the uppermost surface of the compressed mass to expand to an essentially level configuration;

removing said mold from compressed meat unit;

wrapping meat unit and said skewer sleeve with said wrapping material; and lifting wrapped said meat unit on said lifting disc and place in freezer.

2. The process recited in claim 1, wherein said additive ingredients consist of: water, onions, textured soya flours, ground rice, soya and barley flours, honey powder consisting of cane sugar and honey, salt, monosodium glutamate, paprika, and spices.

3. The process recited in claim 1, wherein said lubricant is sprayed onto said mold.

4. The process recited in claim 1, wherein said lubricant is brushed onto said mold.

5. The process recited in claim 1, wherein said lubricant is an edible oil.

6. The process recited in claim 1, wherein said lifting disc is cardboard.

7. The process recited in claim 1, wherein said lifting disc is of a non-cardboard material.

8. The process recited in claim 1, wherein said skewer sleeve is made of plastics.

9. The process recited in claim 1, wherein said skewer sleeve is made of a non-plastics material.

10. The process recited in claim 1, wherein said mandrel is a solid material.

* * * * *